United States Patent [19]

Smith et al.

[11] Patent Number: 5,002,834
[45] Date of Patent: Mar. 26, 1991

[54] OXIDATION RESISTANT ALLOY

[75] Inventors: Gaylord D. Smith; Raymond C. Benn, Huntington, W. Va.

[73] Assignee: Inco Alloys International, Inc., Huntington, W. Va.

[21] Appl. No.: 177,484

[22] Filed: Apr. 1, 1988

[51] Int. Cl.$^5$ .......................... B22F 7/00; B32B 15/01
[52] U.S. Cl. ..................................... 428/552; 428/553; 428/680; 138/425; 138/428
[58] Field of Search ............... 428/679, 678, 553, 552, 428/680; 420/448; 148/425, 428

[56] References Cited

U.S. PATENT DOCUMENTS

| | | | |
|---|---|---|---|
| 3,591,362 | 7/1971 | Benjamin | 75/0.5 B |
| 3,723,092 | 3/1973 | Benjamin | 75/0.512 |
| 3,728,088 | 4/1973 | Benjamin | 28/182.5 |
| 3,743,548 | 7/1973 | Baranow et al. | 148/32 |
| 3,837,930 | 9/1974 | Cairns et al. | 148/11.5 |
| 3,926,568 | 12/1975 | Benjamin et al. | 29/182.5 |
| 3,979,534 | 9/1976 | Rairden, III | 428/652 |
| 3,992,161 | 11/1976 | Cairns et al. | 29/182.5 |
| 4,029,477 | 6/1977 | Grisik | 148/428 |
| 4,101,713 | 7/1978 | Hirsch et al. | 428/554 |
| 4,101,715 | 7/1978 | Rairden, III | 428/680 |
| 4,237,193 | 12/1980 | Jackson et al. | 148/428 |
| 4,460,542 | 7/1984 | Herchenroeder | 420/443 |
| 4,530,885 | 7/1985 | Restall | 428/680 |
| 4,668,312 | 5/1987 | Benn et al. | 148/410 |
| 4,909,984 | 3/1990 | Sicngheiser et al. | 428/680 |

OTHER PUBLICATIONS

G. H. Gessinger, Powder Metallurgy of Superalloys, Jan. 1984, pp. 339–341.

Primary Examiner—Brooks H. Hunt
Assistant Examiner—Ngoclan T. Mai
Attorney, Agent, or Firm—Francis J. Mulligan, Jr.; Edward A. Steen

[57] ABSTRACT

Discloses a composite metal body having an oxide-dispersion-strengthened substrate made by mechanical alloying and a high chromium-aluminum nickel- or cobalt-base coating on the substrate. The substrate is characterized by containing an amount of aluminum effective to react with oxygen and nitrogen within the body of the substrate to prevent migration of these gases to the interface of substrate and coating and to thereby inhibit spalling of the coating.

17 Claims, 11 Drawing Sheets

OXIDATION RESISTANT ALLOY

FIELD OF INVENTION

The present invention is directed to dispersion-strengthened, powder metallurgical nickel-base alloys, and more particularly to Mechanically Alloyed materials of the nickel-chromium type which afford a high degree of resistance to oxidation at elevated temperatures, upwards of 2000–2200° F. (1093–1204° C.).

As is well known to those skilled in the art, powder metallurgical alloys are often strengthened through the incorporation of, comparatively speaking, small amounts of refractory materials, notably oxides and commonly yttrium oxide. Such materials, often referred to as Oxide Dispersion Strengthened ("ODS") alloys find wide and diverse use at both intermediate, say 1200–1500° F. (650–815° C.), and elevated temperatures circa 2000–2200° F. (1093–1204° C.). The well known Mechanically Alloying (MA) Process described in U.S. Pat. Nos. 3,591,362, 3,723,092, 3,725,088, 3,837,930, 3,926,568, etc. and elsewhere has resulted in a number of such products, including INCONEL alloys MA 754 and MA 6000 and INCOLOY alloy MA 956 among others.

Figure 1:
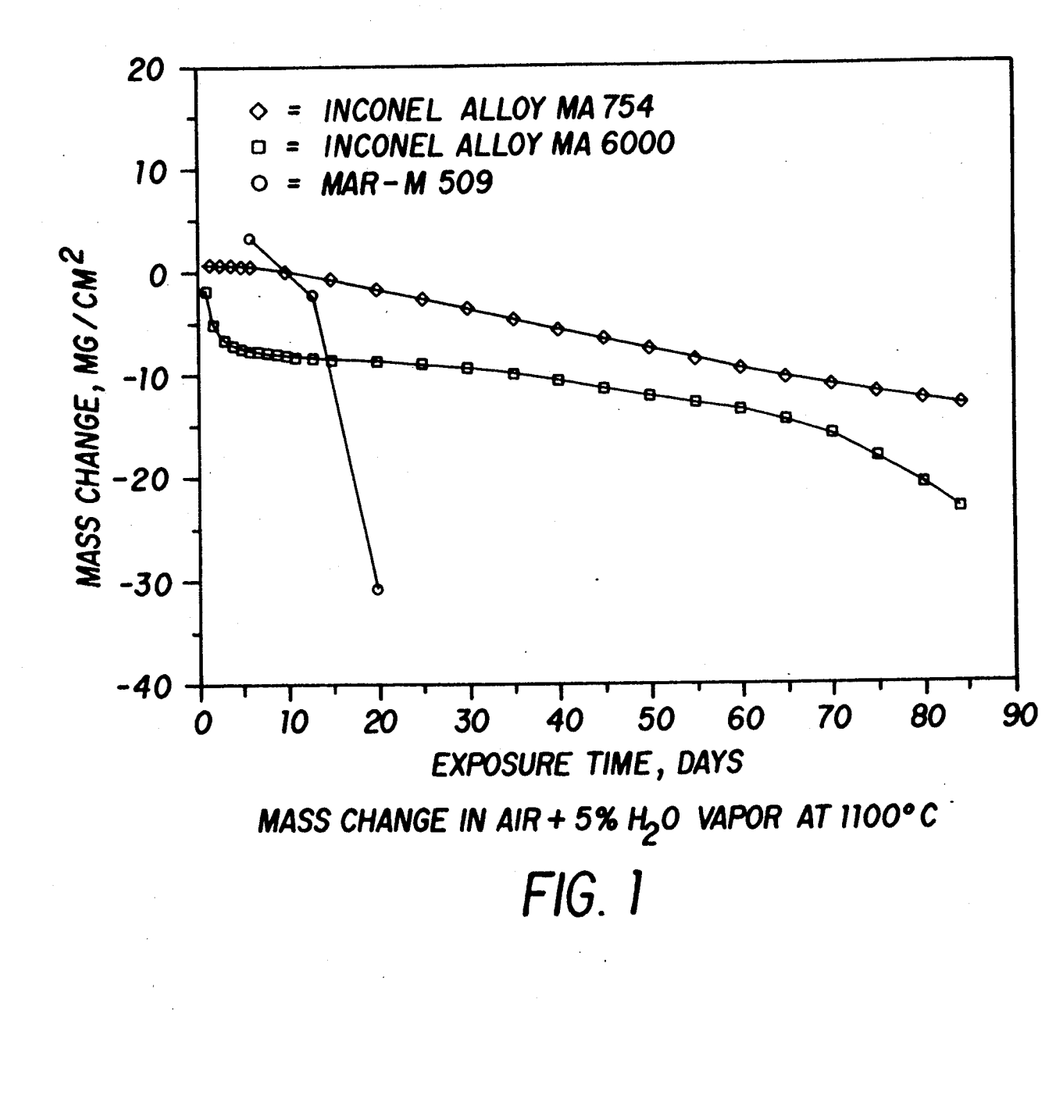
FIG. 1 is a graph interrelating mass change and time for oxidation tests of three different alloys exposed at 1100° C.
Figure 2:
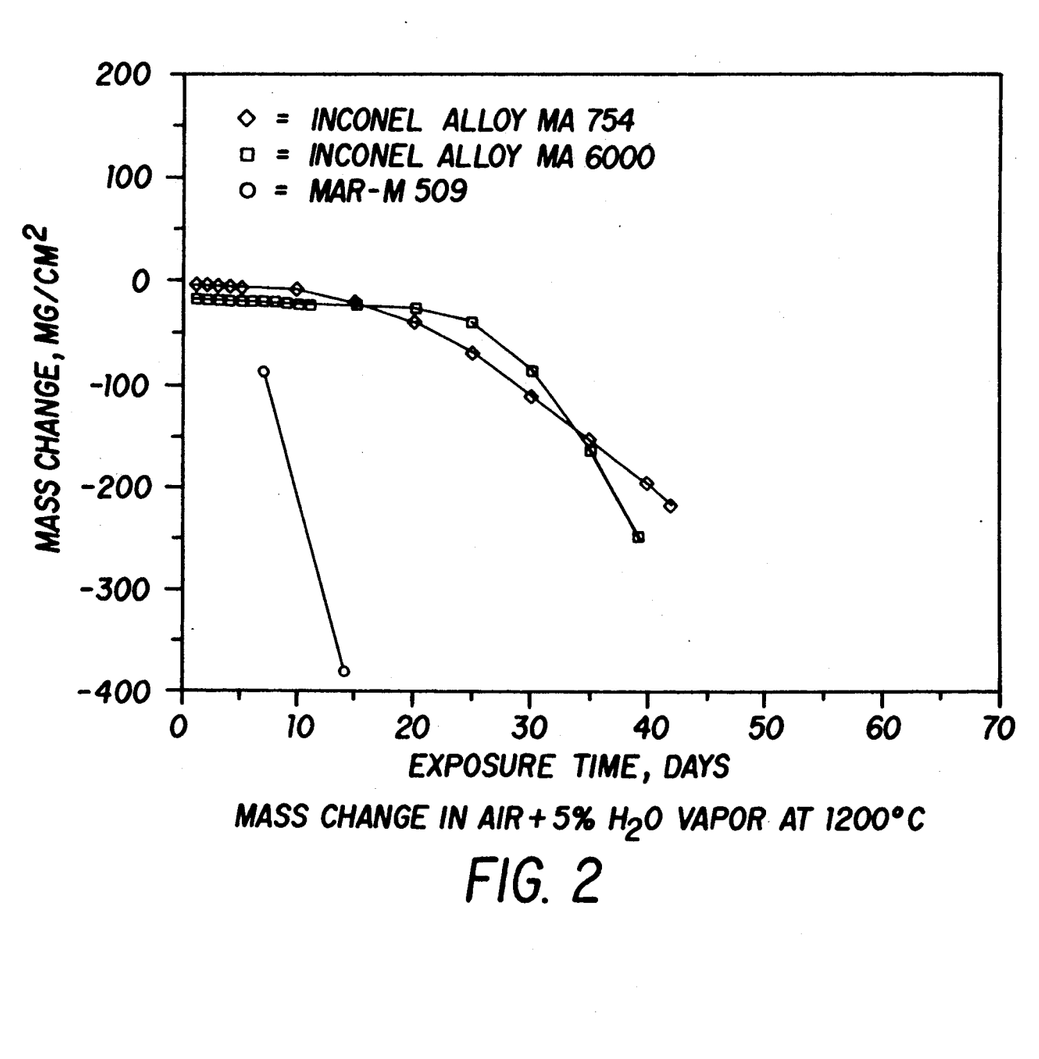
FIG. 2 is a graph similar to that of FIG. 1 relating to exposure of alloys at 1200° C.

754 has witnessed the greatest use to date of the MA alloys. It affords a high level of stress-rupture strength at intermediate temperatures and at 2000–2200° F. it offers acceptable stress rupture properties and excellent oxidation resistance. As a consequence, it is utilized as vanes in gas turbine engines and is suitable in the manufacture of other components for aerospace applications. FIGS. 1 and 2 depict a comparison of MA 754 versus MA alloy 6000 and the well known Mar-M alloy 509 in terms of oxidation resistance at roughly 2000° F. (1100° C.) and 2200° F. (1200° C.).

Notwithstanding the many attributes of MA 754, for the more advanced gas turbine engine applications where operating conditions are the most stringent a still higher level of oxidation resistance for extended service is a desideratum. For this reason, investigations have been undertaken whereby well known highly oxidation resistant coatings have been applied to the MA 754 surface to meet the desired objective. However, an unexpected problem has been experienced. While such coatings initially adhere or bond to the substrate they prematurely tend to loosen from the surface. The problem thus became, in part, one of ascertaining the cause since such coatings bond to other alloys for longer time periods.

From our studies we have found that a troublesome reaction occurs at the substrate surface. Coatings used for oxidation-resistant purposes contain aluminum, a typical composition being 20% Cr, 4% Ta, 8% Al, 23% Co, 0.6% Y, the balance nickel and impurities. (It is sold under the trademark Amdry 997). Apparently, what happens is that oxygen and nitrogen, principally the former, from the ODS substrate material such as MA 754 migrates upwardly to the substrate surface and the aluminum of the coating tends to diffuse into the substrate whereby the aluminum and oxygen/nitrogen react to form a surface oxide and nitride. This in turn subverts the adherence of the coating to the substrate such that it tends to separate or pull away from the surface ultimately adversely impacting oxidation resistance.

SUMMARY OF THE INVENTION

We have found that if aluminum in certain percentages is incorporated in ODS substrate alloys such as MA 754 it will react with the oxygen and nitrogen in the alloy and thus inhibit their migration to the surface such that detrimental volumes of oxides and nitrides are precluded from forming by reason of reacting with the aluminum of the coating material. Put another way aluminum ties up free oxygen/nitrogen in situ thereby inhibiting the diffusion thereof to the coating/alloy substrate interface where these constituents would otherwise react with the aluminum in the coating to form an oxide layer and, to a lesser extent, a nitride layer. These oxide/nitride layers are deemed to enable the thermal stresses of thermal cycling to lift the protective coating from the substrate surface.

EMBODIMENTS OF THE INVENTION

Generally speaking and in accordance with the present invention the substrate alloy contemplated herein contains from about 10 to 35% chromium, about 3 to 9% aluminum, up to about 0.2 % carbon, a refractory oxide in a small but effective amount sufficient to impart strengthening, up to 3% titanium and the balance essentially nickel. It is most preferred that the aluminum content be from about 3.75 or 4% to 7% with the chromium being from 16 to 30%. It is further preferred that titanium be present from 0.1% to 1%. The alloy may also contain up to 10% tungsten, e.g., from 0.5 to 8%; up to 8% molybdenum, e.g., 0.5 to 5%; up to 8% tantalum, e.g., 0.5 to 5%; up to 4% columbium; up to 20% cobalt; up to 4% rhenium; up to 2% hafnium; and up to 4% iron.

The coating material as contemplated herein contains about 15 to 25% chromium, 3 to 11% aluminum, up to about 5% tantalum, about 0.3 or 0.4 to 1% yttrium with nickel, cobalt or iron or a combination thereof constituting the balance plus impurities. Preferably the coating is composed of 20 to 30% chromium, 6 to 8.5% aluminum, 3 to 5% tantalum and about 0.5 to 0.75% yttrium, balance essentially nickel and cobalt.

In carrying the invention into practice care should be exercised in respect of the percentages of the various alloying constituents of the alloy substrate. Should the chromium content exceed about 35%, working and fabricability difficulties may ensue. While 10% chromium may be employed, if the coating is perforated then rapid deterioration oxidation-wise can follow. At least 16%, and advantageously at least 20% chromium, is preferred to thereby counteract this possibility. As will be shown infra, even with 3% aluminum in the alloy body the oxide/nitride can form at the surface. Thus, it is most beneficial that at least 4.5 or 5% aluminum be present. Though aluminum levels up to 8 or 9% can be utilized it is considered that such percentages are unnecessary and may cause excessive hardening and fabrication difficulties and may lower melting points below desired levels. An upper level of 6 to 7% is deemed advantageous.

Carbon should not exceed 0.2 % since it tends to form carbides which in excessive amounts can degrade properties. As indicated above, it is preferred that titanium be present in amounts up to 1% since inter alia it will combine with and thus tie up nitrogen. Higher percentages are not necessary, a range of 0.4 to 0.75% being deemed satisfactory. With regard to the refractory oxide it need not exceed about 1 or 2% though higher percentages up to, say 5% can be present. A range of 0.4 to 1% is quite satisfactory. Below 0.4%, possibly 0.3%, strength may be needlessly impaired. Yttrium oxide is the preferred refractory. Either or both boron and zirconium can be present in percentages of up to 0.2% boron, e.g., 0.003 to 0.1% and up to 0.5% zirconium, e.g., 0.05 to 0.25%, for strengthening and other purposes.

To give those skilled in the art a better understanding of the invention the following data and information are given:

A series of 6 alloys were prepared by the Mechanically Alloying process in a ball mill. Either 0.3%, 3%, 4%, 5.5%, 6% or 7% aluminum was added to the compositions as reported in Table I. Alloy 1 containing 0.3% aluminum corresponds to MA 754 and is the "Control Alloy." The Amdry coating above described was applied to the substrate surfaces using the low pressure plasma spraying technique. The coating thickness averaged 0.0075 in (0.19 mm), the specimens being approximately 0.3 in (7.6 mm) in diameter and 0.75 in (19.1 mm) in length.

TABLE I

| | | | | Substrate Compositions, weight percent | | | | | | | | |
|---|---|---|---|---|---|---|---|---|---|---|---|---|
| Alloy | Ni | Cr | Al | W | Mo | Ti | Ta | C | B | Zr | Y2O3 | Other |
| 1 | Bal. | 20 | 0.3 | — | — | 0.5 | — | 0.05 | — | — | 0.6 | 1 Fe |
| 2 | Bal. | 20 | 3 | — | — | 0.5 | — | 0.05 | — | — | 0.6 | 1 Fe |
| 3 | Bal. | 20 | 4 | — | — | 0.5 | — | 0.05 | — | — | 0.6 | 1 Fe |
| 4 | Bal. | 20 | 5.5 | 4.0 | 2.0 | 2.5 | 2.0 | 0.05 | 0.01 | 0.15 | 0.95 | |
| 5 | Bal. | 20 | 6 | 3.5 | 2.0 | — | — | 0.05 | 0.01 | 0.15 | 0.95 | |
| 6 | Bal. | 9.5 | 7 | 8.0 | 2.0 | — | 1.0 | 0.05 | 0.01 | 0.15 | 1.1 | |
| Amdry 997 | Bal. | 20 | — | — | — | — | 4.0 | — | — | — | — | 0.6Y 8Al,23Co |

The coated specimens were evaluated in a standard burner rig, at 2000° F. (1095° C.) for 500 hours. A ratio of 30:1 air-fuel (JP-5 containing about 850 ppm sulfur with 5 ppm standard sea salt water added) was used. The specimens were exposed for about 58 minutes in the burner flame (mass flow rate was about 5.5 ft³/minute) and then for 2 minutes in a blast of room temperature air. Upon completion of the test, the specimens were sectioned transversely at the midpoint and then examined metallographically (100×magnification) in the unetched condition.

Figure 3:
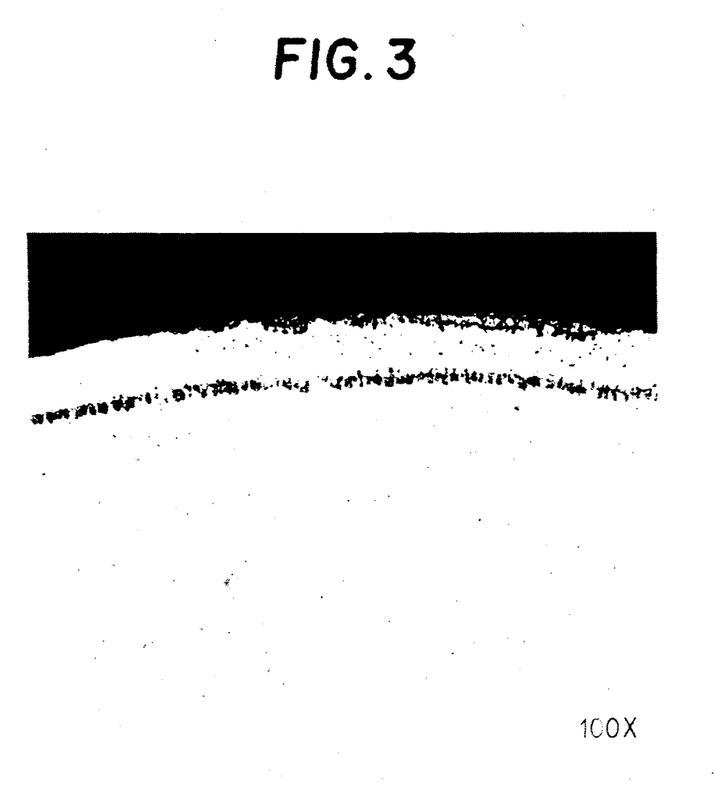
FIGS. 3 to 8 are reproductions of photomicrographs at 100 power of coated structures as disclosed hereinafter.

The photomicrograph in FIG. 3 depicts Control MA 754 (Alloy 1). While the coating in and of itself is highly oxidation resistant (oxidized/sulfidized only slightly), the substrate/coating interface reflects heavy oxidation.. At the top of the pin this layer of oxide/nitride is causative of the coating to lift away from the substrate surface. Our initial impression was that the oxide ($Al_2O_3$) layer resulted from oxygen diffusion through the coating or was caused by the passage of oxygen down through the coating/substrate interface by means of a crack in the coating or other coating defect. This was found not to be the case. The structure of the coating/substrate interface is consistent with oxygen and nitrogen reacting at the interface by diffusion to the interface from within the alloy. The unreacted oxygen content generally was from about 0.1 to 0.5%. It is usually present in about 0.2% in MA alloys. As for unreacted nitrogen, it typically runs from about 0.05 to 0.4 or 0.5% but is usually present in amounts of less than 0.1%.

The finger appearance in FIG. 3 is attributed to the inward diffusion of aluminum from the coating. Accordingly, the "reaction front" of the inwardly diffusing aluminum meeting the outward diffusing oxygen/-nitrogen is continually moving inward because of the faster diffusion of the aluminum down the oxide/metal interface than that of the oxygen/nitrogen diffusion through the grain of the substrate.

Figure 4:
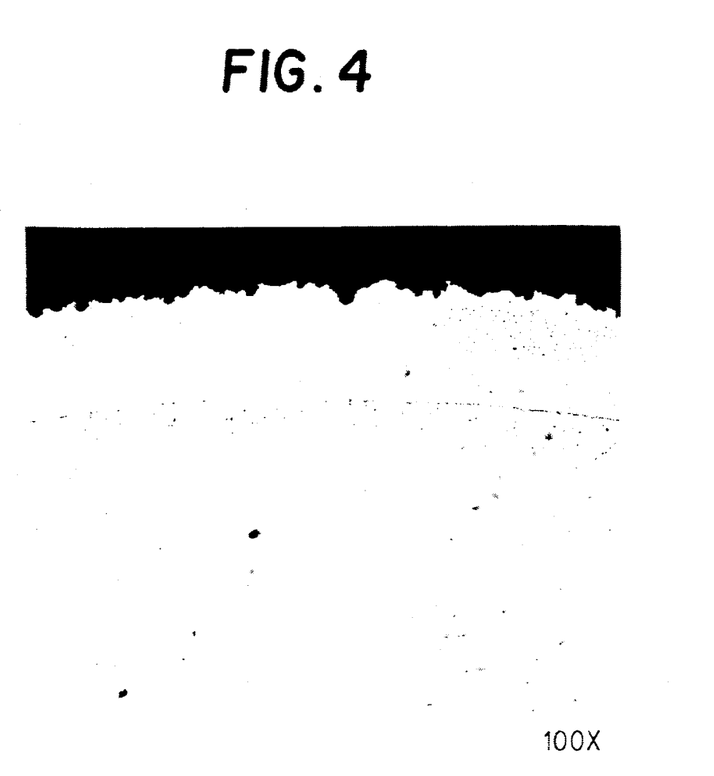
Figure 5:
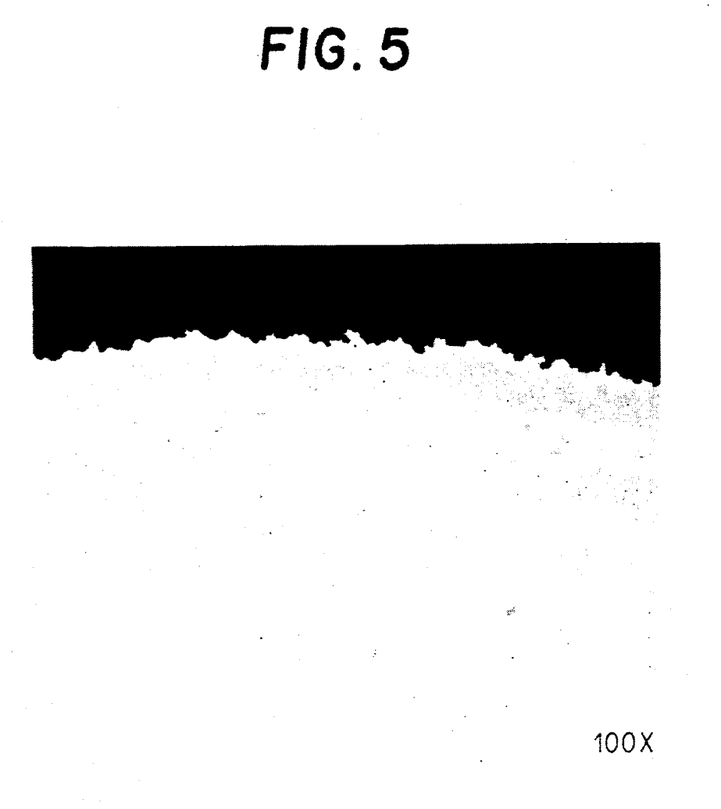
Figure 6:
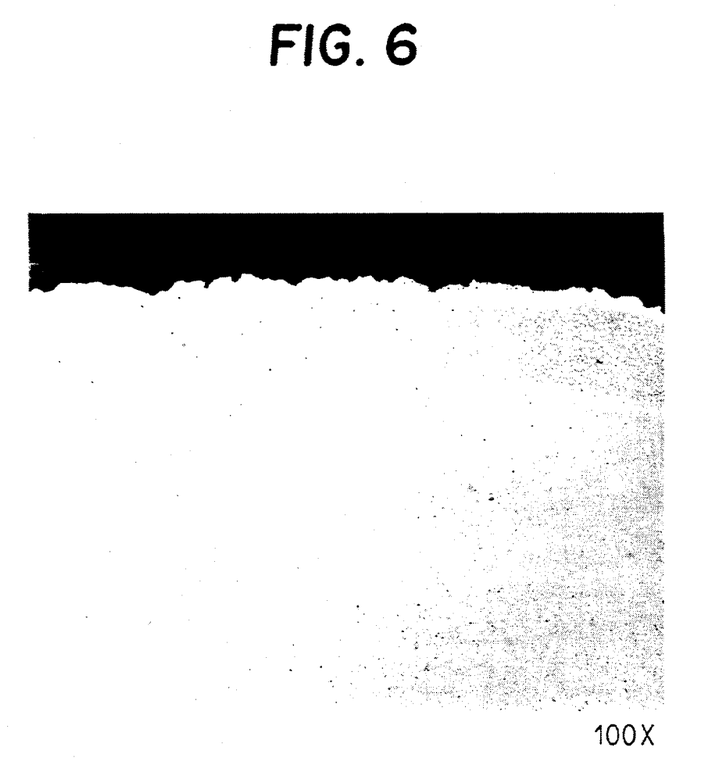
Figure 7:
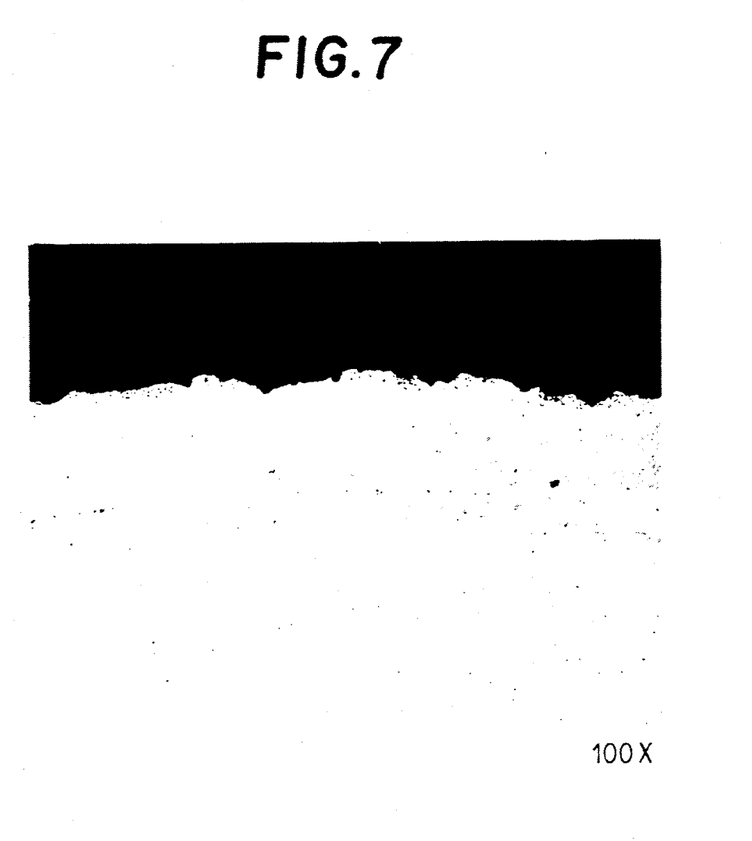
Figure 8:
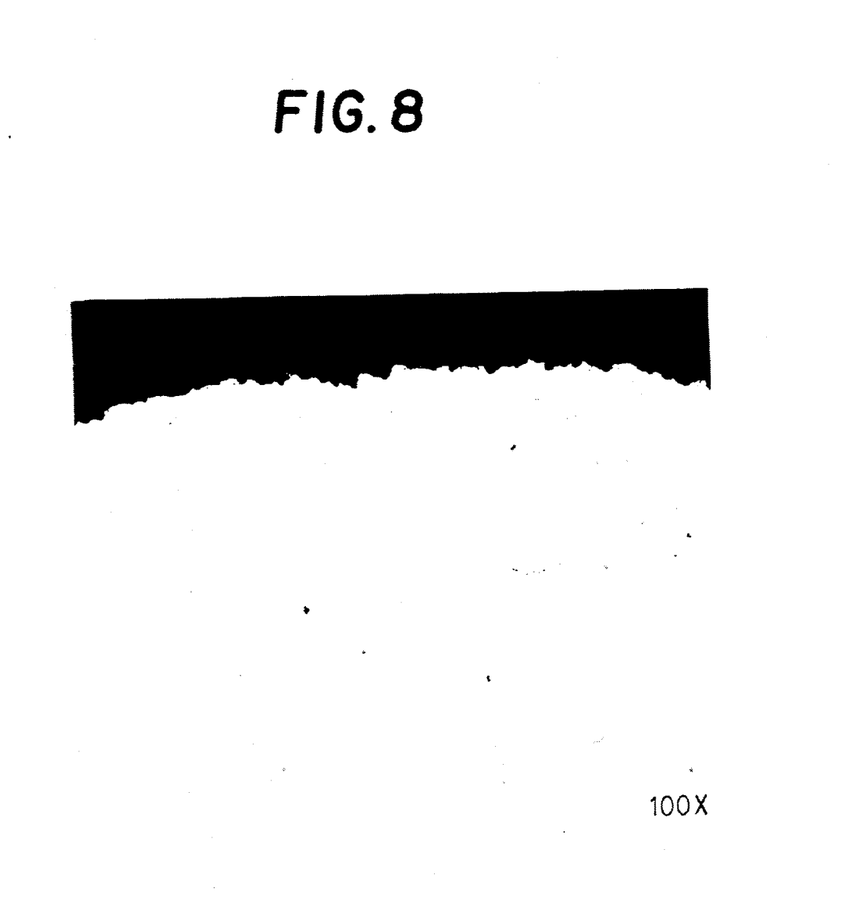

Referring to the photomicrographs FIGS. 4 through 8 it will be noted that in FIG. 4 (Alloy 2) a lesser formation of aluminum oxide occured at the coating/substrate interface after the 500 hour exposure. A still smaller amount of alumina formed with Alloy 3 (FIG. 5), a trend carried forth with Alloy 4 (FIG. 6). At the 6% and 7% aluminum levels (FIGS. 7 and 8) the interface is free of alumina.

A further attribute of the invention alloy is that in the uncoated condition it affords a markedly enhanced level of resistance to oxidation, i.e., the aluminum pro se contributes to oxidation resistance. Thus, the alloy can be used in the absence of a protective coating in most applications.

A still further benefit stemming from the presence of aluminum is that it will form the gamma prime hardening phase $Ni_3Al$ upon heat treatment at 1500 to 1900° F. for about up to 48 hours, e.g., 8 to 24 hours. Gamma prime confers tensile and stress-rupture strength particularly within the intermediate temperature range of 1200/1300° F. to 1500/1600° F.

The effect of aluminum on high temperature tensile strength properties and stress rupture properties is reported in Tables III and IV in respect of Alloys 7-10 set forth in Table II. The compositions were prepared using the Mechanical Alloying process. Alloys 7 and 8 were alloyed in an attritor under a nitrogen/air atmosphere for 30 hrs. using 9/32 in. dia. balls at a ball to powder ratio of 20:1. The resulting powders were screened to remove the +20 mesh particles, tamped into mild steel cans and the cans were preheated for about 1½ hrs. at 1950° F. and extruded into 2"×½" bars. The bars were then heat treated or further hot worked by rolling at various temperatures followed by heat treatment which comprised heating for approximately 1 hr. at 2400° F. followed by air cooling. Alloys 9 and 10 were produced using the 6 ft. dia. ×2 ft. wide ball mill. These alloys contained nominally 0.5% titanium.

TABLE II

| Alloy | Cr % | Al % | Ti % | C % | Y$_2$O$_3$ % | Ni % | Other |
|---|---|---|---|---|---|---|---|
| 1 | 20 | 0.3 | 0.5 | 0.05 | 0.6 | Balance | |
| 7 | 20 | 3 | — | 0.05 | 0.6 | " | |
| 8 | 20 | 4 | — | 0.05 | 0.6 | " | |
| 9 | 20 | 3 | 0.5 | 0.05 | 0.6 | " | |
| 10 | 20 | 4 | 0.5 | 0.05 | 0.6 | " | |

TABLE III

LONGITUDINAL TENSILE PROPERTIES

| Alloy | Test Temp. of °F. (°C.) | Hardness (Rc) | 0.2% YS Ksi (MPa) | UTS Ksi (MPa) | El (%) | RA (%) |
|---|---|---|---|---|---|---|
| 7[1] | 70 (21) | 36 | 92.4 (637) | 122.6 (845) | 14.8 | 18.2 |
| | 800 (427) | — | 77.4 (534) | 111.3 (767) | 13.4 | 23.0 |
| | 1400 (760) | — | 69.1 (476) | 73.8 (509) | 14.8 | 37.2 |
| | 2000 (1093) | — | 14.8 (102) | 16.4 (113) | 9.8 | 36.0 |
| 8[1] | 70 (21) | 42 | 105.9 (730) | 142.7 (984) | 8.3 | 18.2 |
| | 800 (427) | — | 97.9 (675) | 120.6 (831) | 9.4 | 20.3 |
| | 1400 (760) | — | 79.8 (550) | 89.3 (616) | 10.4 | 29.6 |
| | 2000 (1093) | — | 15.7 (108) | 16.1 (111) | 10.8 | 34.4 |
| 7[2] | 70 (21) | 31 | 95.7 (660) | 138.7 (956) | 9.0 | N.D. |
| 8[2] | 70 (21) | 38 | 121.6 (838) | 149.6 (1031) | 5.0 | N.D. |
| 7[3] | 1750 (954) | — | 7.4 (51) | 10.0 (69) | 42.9 | 76.0 |
| 8[3] | 1750 (954) | — | 6.3 (43) | 8.7 (60) | 47.0 | 80.0 |
| 1[1] | 70 (21) | — | 85 (586) | 140 (965) | 21.0 | 33.0 |
| | 800 (427) | — | 78 (538) | 126 (869) | 16.0 | 25.0 |
| | 1400 (760) | — | 40 (270) | 50 (345) | 34.0 | 55.0 |
| | 2000 (1093) | — | 19.5 (134) | 21.5 (148) | 12.5 | 24 |

Notes
[1]Thermomechanically processed bar annealed 1h/2400° F. (1315° C.)/AC
[2]Thermomechanically processed sheet annealed 1h/2400° F. (1315° C.)/AC
[3]As extruded bar, unrecrystallized.

The data in Table III reflect that the tensile strength of Alloys 7 and 8 is at least equal to Control Alloy 1 up to the 2000° F. (1093° C.) test temperature. These alloys showed good ductility in the unrecrystallized condition at 1750° F. (954° C.) (see Table III) which portends good fabricability when thermomechanically processed to bar. Moreover, these alloys could be successfully thermomechanically processed to sheet showing, in preliminary trials and tension tests (Table III), the potential for advantageous applications of these alloys in this product form.

TABLE IV

STRESS RUPTURE PROPERTIES AT 2000° F.

| | Rupture Stress Ksi (MPa) | | | |
|---|---|---|---|---|
| | 100 h | | 1000 h | |
| Alloy | Long | Long Transv. | Long | Long Transv. |
| 7-8* | 12 (83) | 7 (48) | 11.5 (79) | 4.5 (31) |
| INCONEL Alloy MA 754 | 14.8 (102) | 5.5 (38) | 13.6 (94) | 3.5 (24) |
| INCOLOY Alloy MA 956 | 8.3 (57) | 8.3 (57) | 7.4 (51) | — — |

*Estimates assume same stress-time slope as INCONEL alloy MA 754.

In terms of stress-rupture properties, Table IV above, the extruded bars were hot rolled to 25–46%, typically 30%, thickness reduction at temperatures from 1750–2100° F. followed by annealing at about 2400° F. to assess secondary the crystallization response and texture development. Coarser secondary recrystallize grain structures were obtained with higher rolling temperatures. This tended to result in improved stress-rupture properties at 2000° F. In this connection the grain aspect ratio ("GAR") has an important influence on high temperature rupture strength where GAR values in the range 5–10 and above enhance longitudinal rupture strength considerably. In certain applications this high strength is desirable in combination with low modulus (21–22 ksi/150 GPa) textures. Using suitable thermomechanical processing conditions it has been possible to produce the instant alloys with low modulus textures which will, thereby, improve fatigue (e.g. thermal) resistance. In sheet form this texture is also often desirable (in the plane of the sheet) but, more importantly, isotropic properties are necessary for fabricability and service. In regard to this, more uniform grain structures having aspect ratios approximating unity are desirable. Such structures have been developed in the sheet form of the invention alloy.

Figure 9:
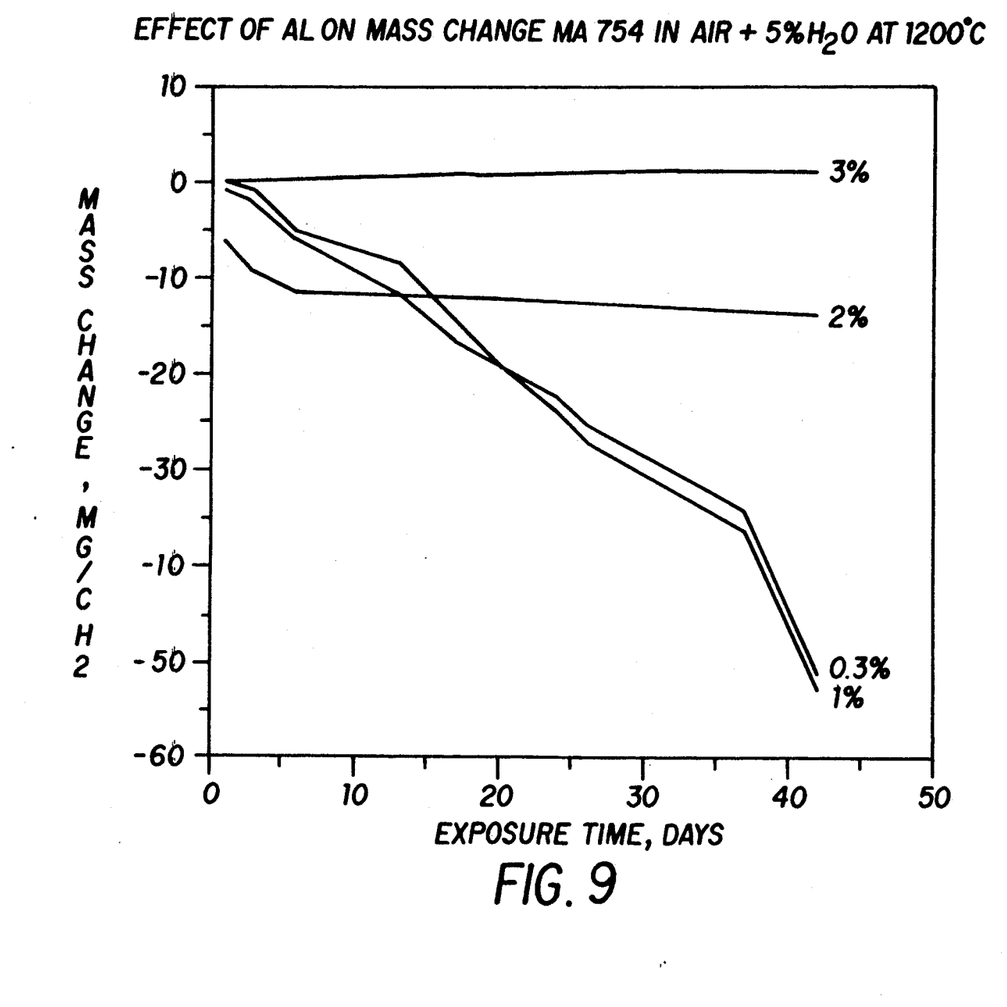
FIG. 9 is a graph similar to that of FIG. 2 with respect to alloys of differing aluminum content.
Figure 10:
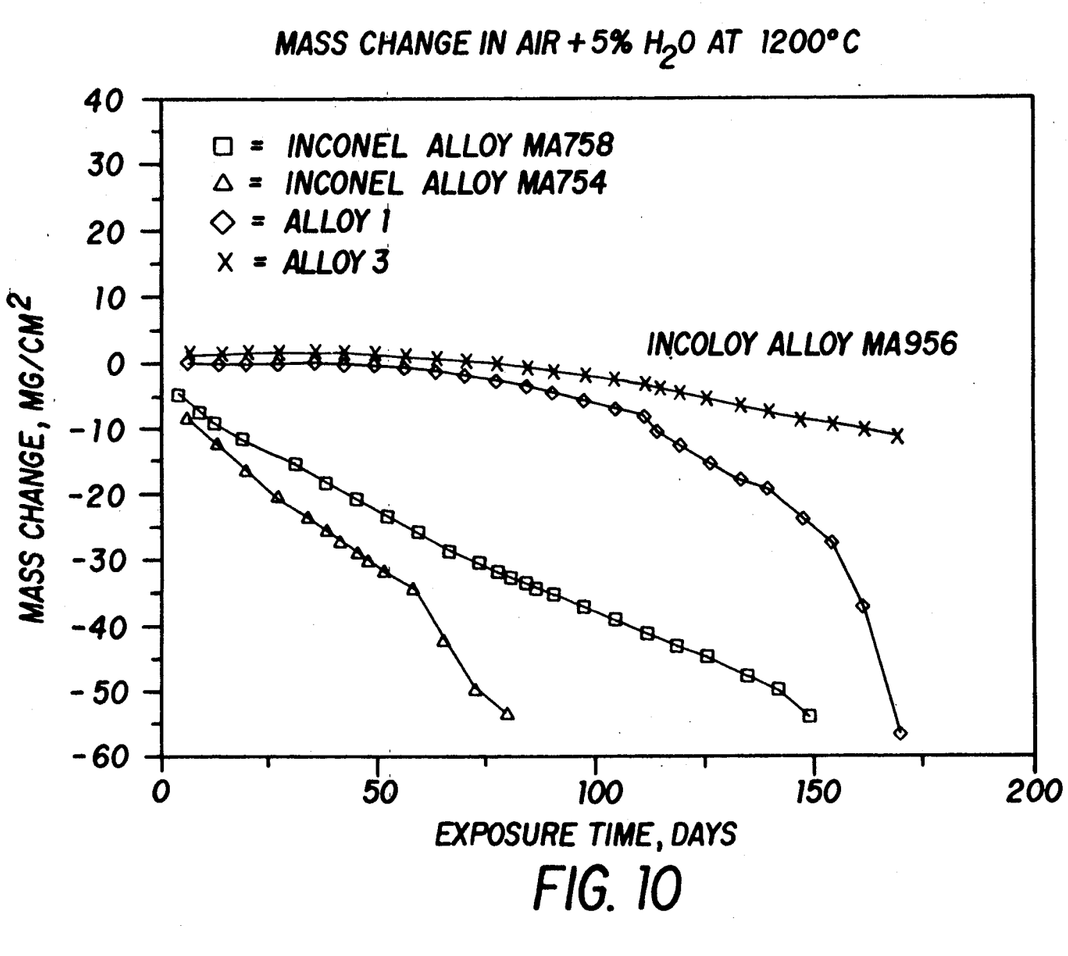
FIG. 10 is a graph similar to that of FIG. 9 with respect to four different alloys.
Figure 11:
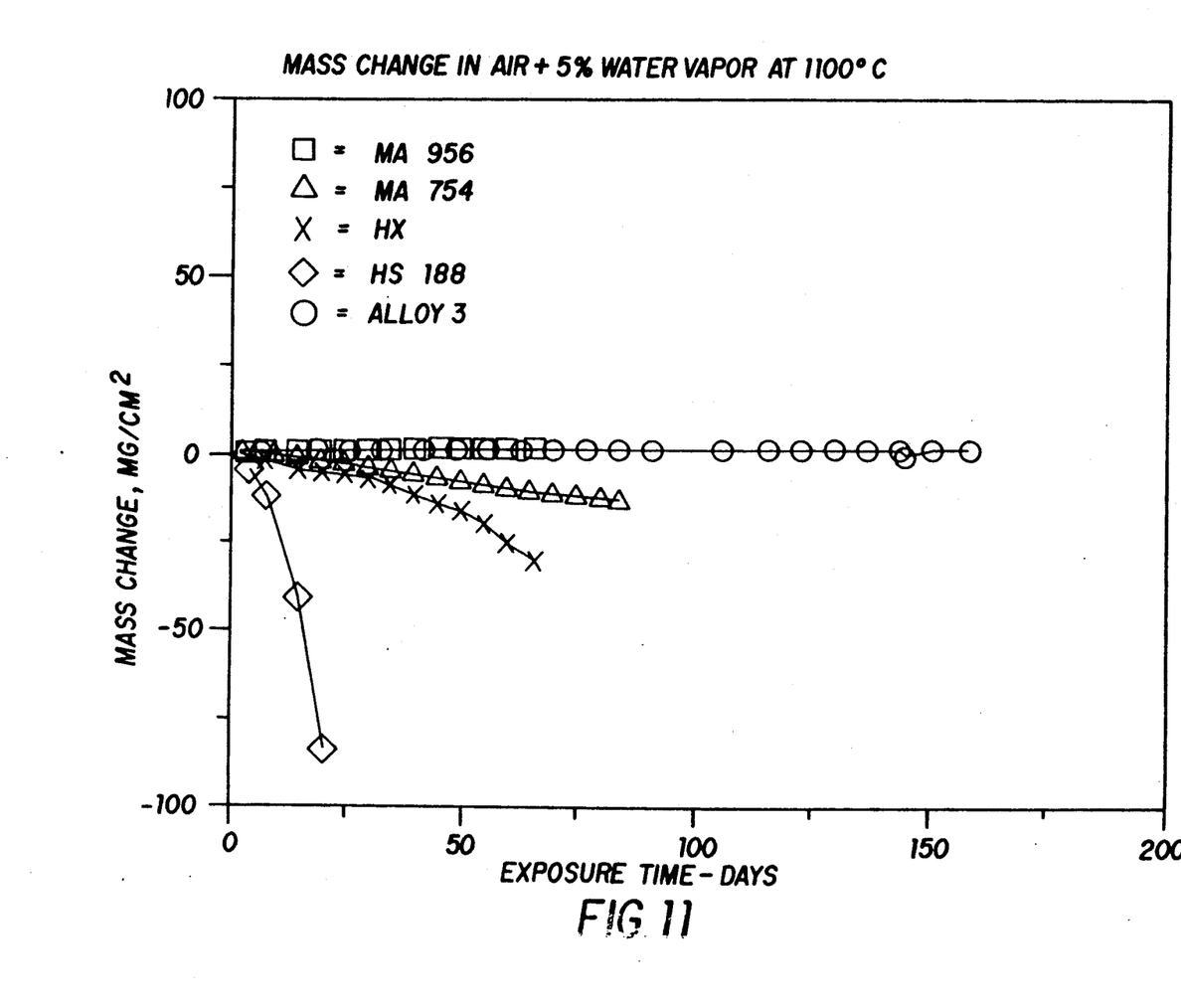
FIG. 11 is a graph similar to that of FIG. 1 with respect to five different alloys.

As above noted, the presence of aluminum in the subject alloy, confers improved resistance to oxidation. It also enhances hot corrosion resistance. FIGS. 9 to 11 and Table V set forth the oxidation resistance and burner rig corrosion resistance, respectively, of Control Alloy 1 (MA754) versus the subject alloy. FIGS. 10–12 include data in respect of other well known alloys including MA alloys 758 and 956, Alloys HX and HS 188. MA 956 is one of the best known powder metallurgical alloys for resistance to oxidation.

TABLE V

| Burner Rig Oxidation/Sulfidation Results After 312 h at 2000° F. (1093° C.) | | |
|---|---|---|
| Alloy | Metal Loss Diameter of Pin (inch) | Depth of Attack Diameter of Pin (inch) |
| 1 | 0.0127 | 0.0185 |
| 9 | 0.0022* | 0.010 |
| 10 | 0.0011* | Nil |

*Gain in diameter due to adherent scale.

It is to be further added that any suitable coating can be used which is highly oxidation resistant provided that it contains aluminum. It is the aluminum that is important as those skilled in the art will understand from the foregoing.

The foregoing discussion is centered upon alloys formed by powder metallurgical techniques. However, it is deemed that wrought alloys of the described compositions can also be coated to form useful composite bodies. As a practical matter, this could be the case using air melting practice though little oxygen and/or nitrogen would be present in respect of vacuum melting. Such alloys would not require a refractory oxide. Yttrium up to 0.5 or 1% or cerium up to 0.25 or 0.5% and the like could be used in lieu of the refractory oxide. It is also considered that corresponding wrought alloys can be utilized in the non-coated condition for various applications where resistance to oxidation attack is required. As indicated in the heading in Table I herein, all metal compositions in this specification and claims are in terms of weight percent.

While the present invention has been described with reference to specific embodiments, it is to be understood that modifications and variations may be resorted to without departing from the spirit and scope of the invention, as those skilled in the art will readily understand. Such modifications and variations are considered to be within the purview and scope of the invention and appended claims. A given percentage range of alloying constituent can be used with the percentage range given for the other constituents. The term "balance" or "balance essentially" used in referring to the nickel content of the alloy does not exclude the presence of other elements in amounts which do not adversely affect the basic characteristics of the invention alloy.

The embodiments of the invention in which an exclusive property or privilege is claimed are defined as follows:

1. A composite metal body consisting of a coating and an oxide dispersion strengthened powder metallurgical alloy substrate, said coating consisting essentially of 15-25% chromium, about 3 to 11% aluminum, up to 5% tantalum, yttrium up to 1% and the balance nickel and cobalt, with the alloy consisting essentially of 10 to 35% chromium, from 3 to 9% aluminum, up to 0.2% carbon, a refractory oxide in a small but effective amount of about 0.3 up to 5% to enhance strength, up to 3% titanium, up to 10% tungsten, up to 8% molybdenum, up to 8% tantalum, up to 4% columbium, up to 20% cobalt, up to 4% rhenium, up to 2% hafnium, up to 4% iron, the balance being nickel.

2. The composite metal of claim 1 in which the coating contains about 6 to about 8.5% aluminum.

3. The composite metal body of claim 1 in which the substrate alloy contains about 0.1% to 1% titanium.

4. The composite metal body of claim 1 in which the substrate alloy contains 16 to 30% chromium, about 4% to 7% aluminum, about 0.3 to 2% yttria, up to 0.1% boron, up to 0.25% zirconium, up to 8% tungsten, up to 5% molybdenum, up to 2% columbium, up to 15% cobalt, up to 2% rhenium, up to 1% hafnium and up to 2% iron.

5. The composite metal body of claim 1 in which the substrate alloy contains about 5 to 7% aluminum.

6. The composite metal body of claim 4 in which the aluminum of the substrate alloy is at least 4.5%.

7. A powder metallurgical alloy characterized by good oxidation resistance at temperature as high as 2200° F., good resistance to sulfidation at high temperatures, and good tensile and stress-rupture strength at temperatures from 1300° F. to 2200° F. said alloy consisting essentially of 16 to 30% chromium, about 3 to 9% aluminum, a refractory oxide in an amount about 0.3 to 5%, about 0.1 to 3% titanium, up to 10% tungsten, up to 8% molybdenum, up to 8% tantalum, up to 4% columbium, up to 20% cobalt, up to 4% rhenium, up to 2% hafnium, up to 4% iron and the balance nickel.

8. The alloy set forth in claim 7 containing 5 to 7% aluminum.

9. The alloy of claim 7 in sheet form and having a grain aspect ratio of about 1.

10. The alloy of claim 7 having a grain aspect ratio of at least 5.

11. The alloy of claim 7 in which titanium is present from 0.1 to 1%.

12. A composite metal body consisting of a coating and an oxide dispersion strengthened powder metallurgical alloy substrate, said coating containing at least 3% aluminum, with said alloy consisting essentially of 10 to 35% chromium, from 3 to 9% aluminum, up to 0.2% carbon, a refractory oxide in a small but effective amount of about 0.3 up to 5% to enhance strength, up to 3% titanium, up to 10% tungsten, up to 8% molybdenum, up to 8% tantalum, up to 4% columbium, up to 20% cobalt, up to 4% rhenium up to 2% hafnium, up to 4% iron, the balance fine nickel.

13. A wrought alloy characterized by good oxidation resistance at temperature as high as 2200° F., good resistance to sulfidation at high temperatures, and good tensile and stress-rupture strength at temperatures from 1300° F. to 2200° F. said alloy consisting essentially of 16 to 30% chromium, about 3 to 9% aluminum, yttrium about 0.3 up to 1%, about 0.1 to 3% titanium, up to 10% tungsten, up to 8% molybdenum, up to 8% tantalum, up to 4% columbium, up to 20% cobalt, up to 4% rhenium, up to 2% hafnium, up to 4% iron and the balance nickel.

14. The alloy as set forth in claim 13 containing 5 to 7% aluminum.

15. The alloy of claim 13 in which titanium is present from 0.1 to 1%.

16. A composite metal body consisting of a coating and an oxide dispersion strengthened powder metallurgical alloy substrate, said coating consisting essentially of about 20 to 30% chromium, about 6 to 8.5% aluminum, about 3 to 5% tantalum, about 0.5 to 0.75% yttrium, the balance being nickel and cobalt, with the alloy consisting essentially of 10 to 35% chromium, from 3 to 9% aluminum, up to 0.2% carbon, a refractory oxide in a small but effective amount of about 0.3 up to 5% to enhance strength, up to 3% titanium up to 10% tungsten, up to 8% molybdenum, up to 8% tantalum, up to 4% columbium, up to 20% cobalt, up to 4% rhenium up to 2% hafnium, up to 4% iron, the balance being nickel.

17. A composite metal body as in claim 16 wherein said coating contains about 23% cobalt.

* * * * *